United States Patent [19]
Russell et al.

[11] Patent Number: 5,036,304
[45] Date of Patent: Jul. 30, 1991

[54] ROLAMITE SENSOR

[75] Inventors: Richard J. Russell, Burbank; Freddie E. Hunt, Rancho Cucamonga; Frank K. Chung, Diamond Bar, all of Calif.

[73] Assignee: TRW Technar Inc., Irwindale, Calif.

[21] Appl. No.: 500,691

[22] Filed: Mar. 28, 1990

[51] Int. Cl.$^5$ .................... H01F 1/00; H01H 1/12; H01H 35/14
[52] U.S. Cl. .................... 335/209; 200/61.53; 200/503; 335/2
[58] Field of Search ...... 200/52 R, 61.45 R, 61.45 M, 200/61.53, 503; 335/2, 185, 209, 230

[56] References Cited

U.S. PATENT DOCUMENTS

| | | | |
|---|---|---|---|
| 3,452,309 | 6/1969 | Wilkes | 200/52 R X |
| 3,686,597 | 8/1972 | Harley et al. | 335/2 X |
| 3,812,726 | 5/1974 | Bell | 200/61.45 R X |

OTHER PUBLICATIONS

Sandia Laboratories; D. F. Wilkes; "Rolamite: A New Mechanical Design Concept."; 12-1967, pp. 1,162,170,171.
Technar, "Safing Sensor, Common".
Technar, Inc., "Switch, Acceleration Activated".
Reference Work *Rolamite: A New Mechanical Design Concept;* Sandia Laboratories; D. F. Wilkes; 03-1969; pp. 36,46,59,60.

*Primary Examiner*—J. R. Scott
*Attorney, Agent, or Firm*—Tarolli, Sundheim & Covell

[57] ABSTRACT

A rolamite sensor for use in sensing deceleration of a vehicle includes two separate electrical circuits for actuating two occupant restraints such as air bags. The sensor has a molded plastic base mounted on a metal chassis and a metal cover welded to the chassis to sealingly enclose the base. One surface of the base acts as a guide surface for a roller. A pair of thin metal bands are wrapped around the roller. Each band is fixed at one end to the base and at the other end to a J-shaped tensioner underneath the base. The roller is rollable on the guide surface under an applied force to cause the band to engage firing contacts to complete the electrical circuits. An optical electromagnet may be fixed to the chassis without increasing the overall size of the sensor. The electromagnet is selectively operable to attract the roller to test the sensor by completing the electrical circuits. The electromagnet includes a ferromagnetic core and a coil wound directly on the core. The roller has a ferromagnetic insert formed in a dumb-bell shape, that is, having a larger cross-section at its ends than in the middle to increase the attractive force of the electromagnet without significantly increasing weight and thus inertia of the roller. The chassis and the cover may be made of a ferromagnetic material to shield the sensor from external magnetic fields.

31 Claims, 7 Drawing Sheets

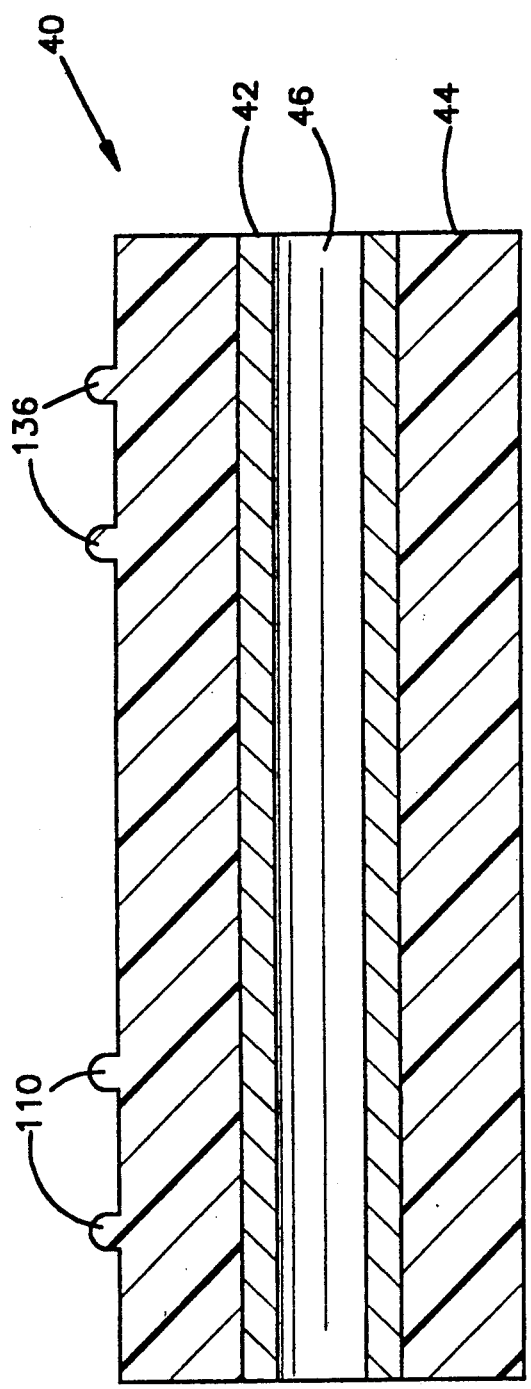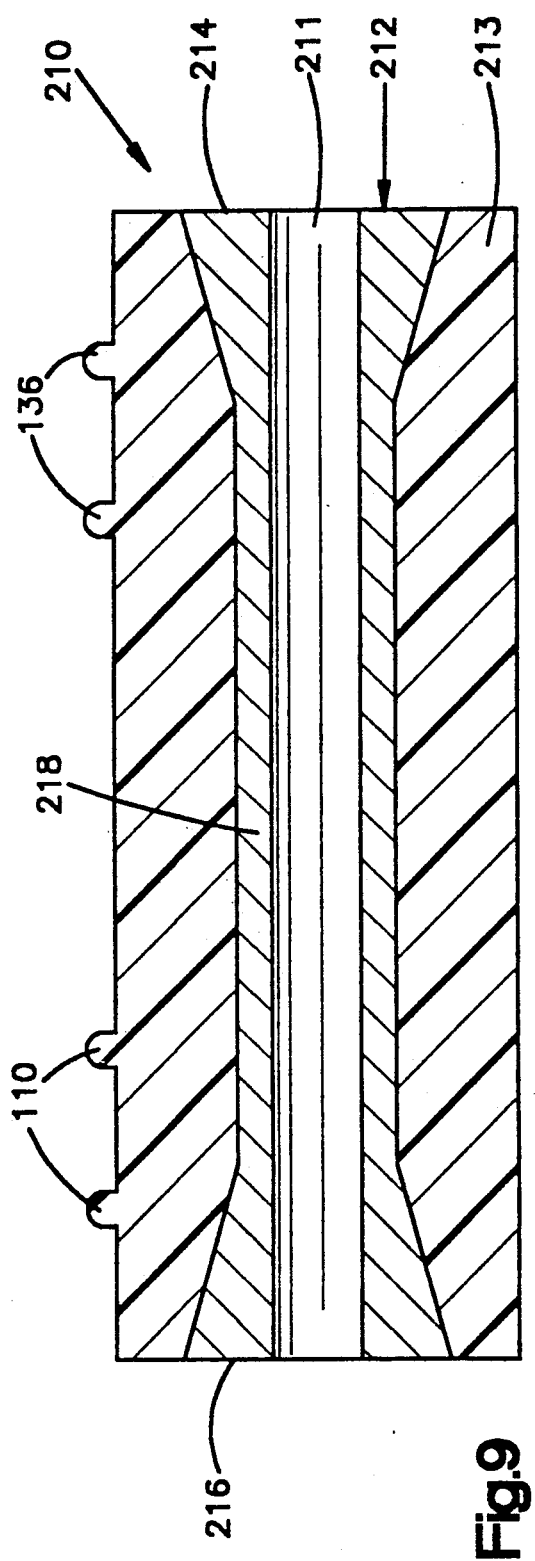

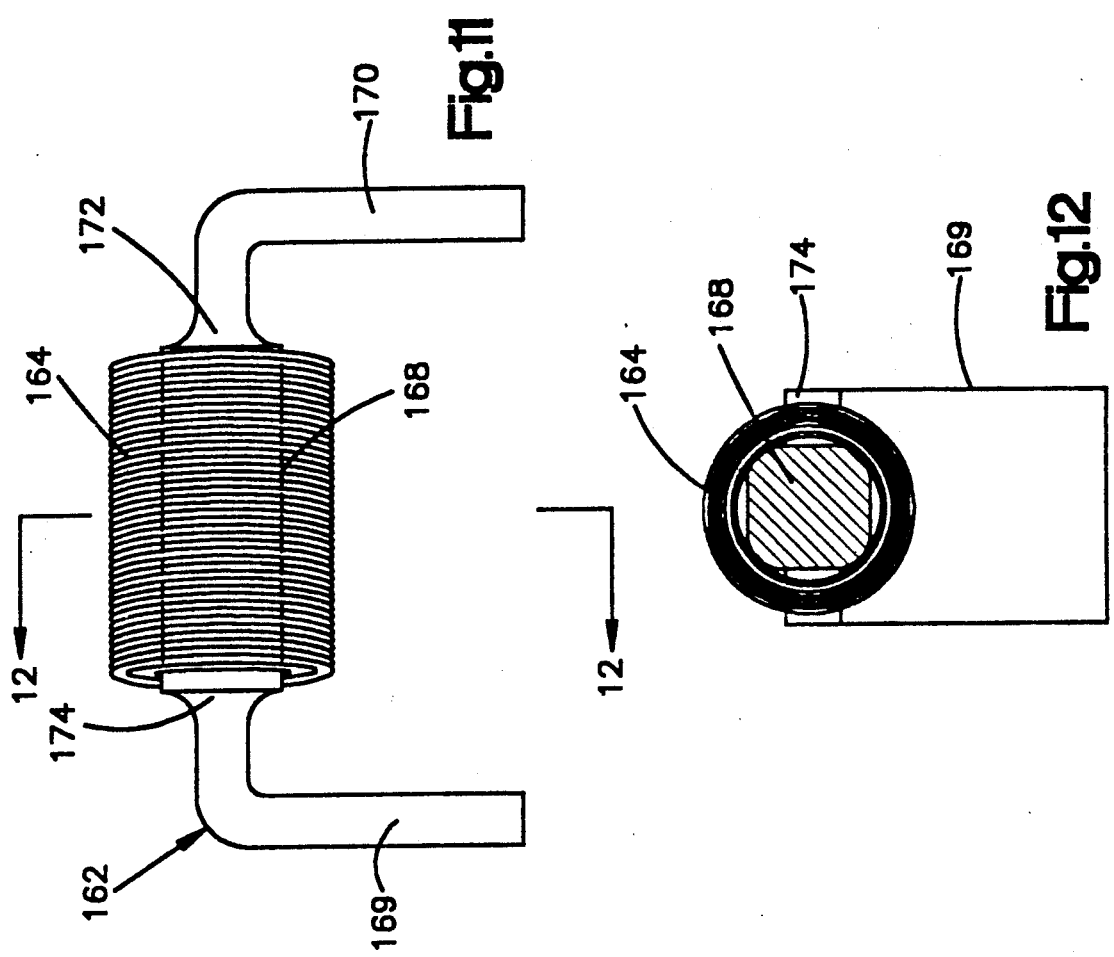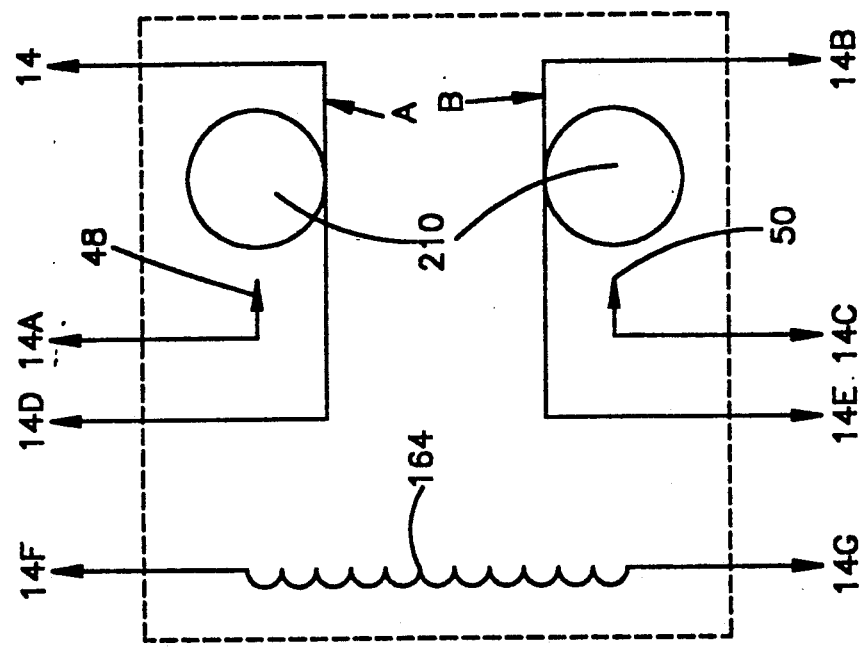

ROLAMITE SENSOR

BACKGROUND OF THE INVENTION

1. Technical Field

The present invention relates to a rolamite sensor for sensing deceleration of a vehicle, and particularly to a sensor for actuating a vehicle occupant restraint such as an air bag.

2. Description of the Prior Art

A known rolamite sensor has a movable member, preferably a roller, which moves along a guide surface in response to deceleration of a vehicle in which the sensor is mounted. The sensor has two independent electrical circuits. Each circuit uses an S-shaped band which at least partially encircles the roller. Each band is welded at one end to a tensioner fixed to a base. The tensioners protrude upwardly from the base above the guide surface for the roller. The tensioners take up a significant amount of space and require the sensor to have a relatively large enclosure.

Another known rolamite sensor has two S-shaped bands which at least partially encircle the roller, but only one electrical circuit. The roller is electrically conductive and has a permanent magnet core. An electromagnet is operative to repel the roller. When the roller is repelled by the electromagnet, the circuit should be completed. Thus, the electromagnet is operated to test the sensor. The electromagnet has a coil wound around a plastic bobbin on a multi-piece magnetic core. The electromagnet is disposed beyond one end of the path of movement of the roller, and takes up a substantial part of the overall volume of the sensor. The electromagnet is fixed to the plastic base of the sensor, and the sensor is much larger than if the electromagnet were omitted.

SUMMARY OF THE INVENTION

The present invention is a rolamite sensor for use in sensing deceleration of a vehicle to actuate a vehicle safety device such as an air bag. The sensor includes a movable member, preferably a roller, and a base. The base has a guide surface along which the roller moves. The sensor has two separate electrical circuits, for actuating two separate vehicle safety devices. Two S-shaped bands of flexible electrically conductive material at least partially encircle the roller. Movement of the roller causes different sections of the bands to wrap around the roller. The bands normally bias the roller into a first position along the guide surface of the base. Conductive members are in the path of displacement of the roller at a location spaced from the roller and the bands when the roller and bands are in the first position. The roller is movable along the guide surface from the first position to a second position in which portions of the bands contact the conductive members, to complete circuits for electrical current through the conductive members and the bands.

The sensor includes two band tensioners, one for each band, fixed to the base. The band tensioners apply force to the band to tension the band. Each tensioner has a first portion connected to the base on a side of the base opposite the guide surface, and projects outwardly of the guide surface on the base. Each tensioner has a curved end portion spaced from the base. An end portion of each band is fixed to the first portion of its respective tensioner. The band extends from the first portion of the tensioner around the curved end portion of the tensioner toward the guide surface of the base.

Because the tensioners are on the side of the base opposite the guide surface, they take up little space within the sensor. The tensioners are resilient. Thus, forces, such as vibration, applied to the band which would tend to pull the roller away from the guide surface are absorbed by the resilient tensioners. Such forces are encountered by the sensor in the field.

A sensor of the present invention may include an electromagnet which is selectively operable to attract the roller along the guide surface from its first position to its second position to test the sensor. The optional electromagnet may be selectively fixed to a sensor chassis, adjacent the base. The electromagnet includes a non-magnetic frame secured to a portion of the chassis. The frame supports a one-piece U-shaped magnetic core having leg portions or poles spaced about the path of displacement of the roller and projecting toward the roller. The electromagnet coil is wound directly on the central portion of the core. To test the sensor, the electromagnet is energized and attracts the roller along the guide surface from the first position to the second position.

The roller has a ferromagnetic insert which has a dumb-bell shape, i.e., it has a larger radial dimension at its axial ends than in the middle. This increases the attractive force of the electromagnet without adversely increasing the weight and inertia of the roller. A cover and the chassis sealingly enclose the base and the roller. The cover and the chassis may be made of a magnetic material to shield the sensor from external magnetic fields.

BRIEF DESCRIPTION OF THE DRAWINGS

Further features of the present invention will become apparent to those skilled in the art to which the present invention relates from reading the following specification with reference to the accompanying drawings, in which:

FIG. 3 is a longitudinal sectional view of the roller of the sensor of FIG. 1;

FIG. 9 is a longitudinal sectional view of the roller of the sensor of FIG. 7;

FIG. 10 is a schematic diagram of the electrical circuitry of the sensor of FIG. 7;

FIG. 11 is a plan view of the electromagnet core of the sensor of FIG. 7; and

FIG. 12 is a transverse sectional view taken along line 12—12 of FIG. 11.

DESCRIPTION OF A PREFERRED EMBODIMENT

Figure 1:
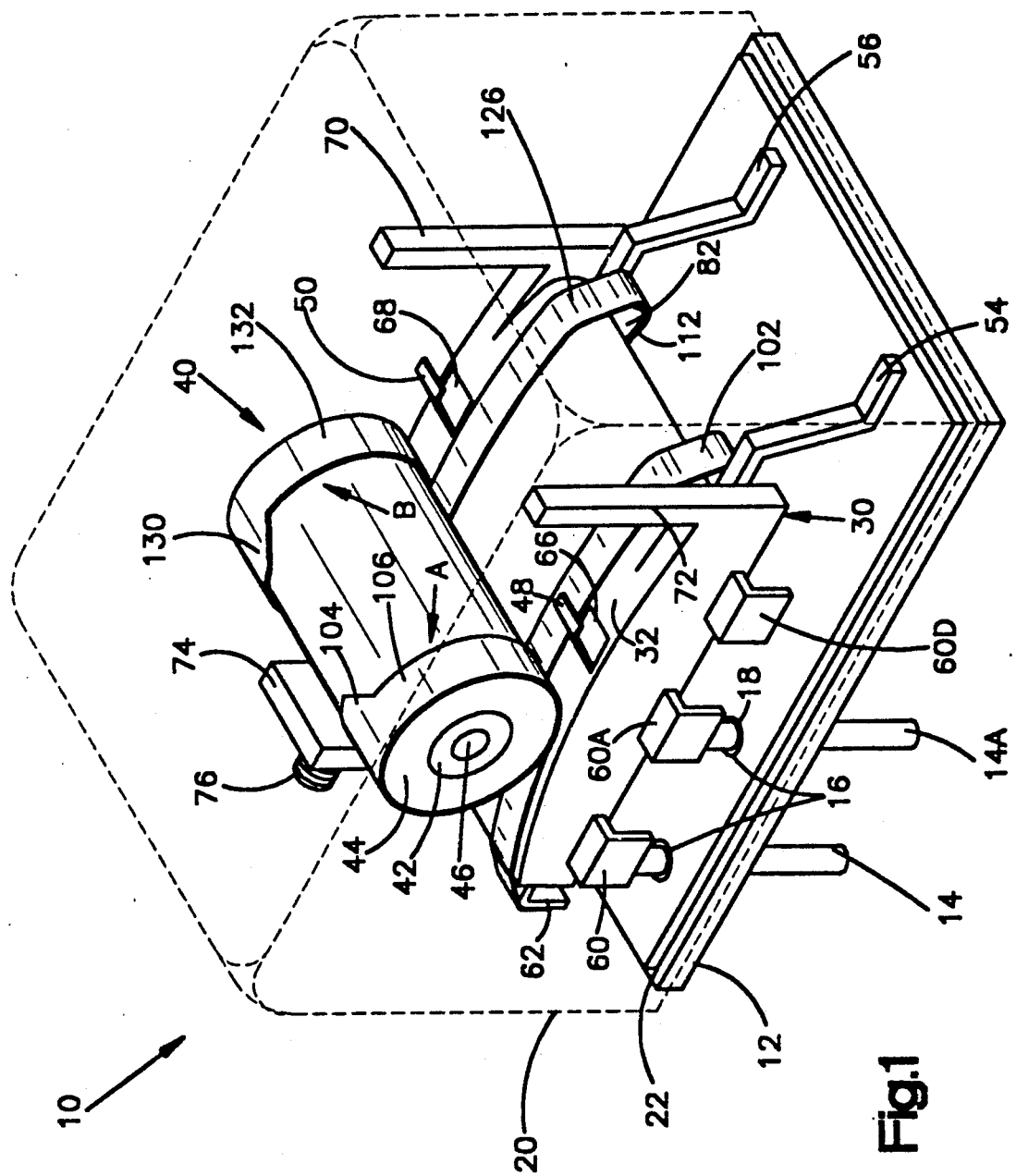
FIG. 1 is a perspective view of a sensor embodying the present invention, without the optional electromagnet assembly, and with the cover shown in dotted lines only.

A rolamite sensor 10 (FIG. 1) includes a metal chassis 12 having a generally rectangular shape. The sensor 10 includes two separate electrical circuits, for actuating two separate vehicle safety devices. The circuits terminate in a plurality of electrical contact pins such as pins 14 and 14A shown in FIG. 1, which project through openings 16 in the chassis 12. The contact pins connect the electrical circuits within the sensor 10 to electrical circuitry in the vehicle safety devices.

The contact pins such as pins 14, 14A are made of an iron nickel alloy. The pins may be copper-plated and may be pre-tinned for assembly to the electrical circuitry in the vehicle safety devices. The openings 16 in the chassis 12 through which the pins extend are sealed with a glass material 18. The glass 18 electrically insulates the pins from the chassis 12, secures the pins in position relative to the chassis 12, and hermetically seals the openings 16 in the chassis 12. The glass 18 used is preferably Corning Glass Works Alloy 90/13 or the equivalent.

A metal cover 20 fixed to the chassis 12 hermetically seals the sensor 10. The cover 20 is welded to the chassis 12. The chassis 12 has a coined edge or step 22 which receives the edge of the cover 20. The coined edge 22 of the chassis 12 lessens the possibility of weld material entering the sensor 10 during the welding of the cover 20 to the chassis 12.

A base 30 is attached to the chassis 12 and is located inside the cover 20. The base 30 is molded from an electrically insulating plastic material. The surface of the base 30 facing away from the chassis 12 is a curved guide surface 32 which defines a path for rolling movement of a roller 40. The roller 40 has a cylindrical configuration. The roller 40 comprises a metal roller insert 42 around which is molded a plastic roller shell 44. The metal roller insert may be made of non-magnetic material (such as brass) for use in the sensor configuration of FIG. 1. The metal roller insert must be made of magnetic material for use in the sensor configuration of FIG. 7. The roller shell 44 is preferably made of the same material as the base 30. The roller 40 is hollow, and has an axial passage 46.

The roller 40 is mounted on the base 30 by two bands A and B. The bands A and B are made of a flexible electrically conductive material, preferably a beryllium nickel alloy about 0.025 mm thick. Two firing contacts 48 and 50 project through the guide surface 32 of the base 30 to be contacted by band portions wrapped around the roller 40. The roller 40 is rollable on the guide surface 32 under an applied force, such as vehicle deceleration above a predetermined rate, to cause the bands A and B to engage the firing contacts 48 and 50 to complete the electrical circuits within the sensor 10, as will be described below.

Three metal legs 54, 56, and 58 (FIG. 2) extend downwardly from the base 30 and are welded to the chassis 12. The legs 54, 56, and 58 are electrically insulated by the material of the base 30 from the remainder of the sensor 10. The legs 54, 56, and 58 support the base 30, and the other components of the sensor 10 which are mounted on the base 30, on the chassis 12.

A plurality of metal terminals are molded into the base 30 and extend laterally from the base 30 and are bent downwardly. Two such terminals 60 and 60A are illustrated in FIG. 1. The downwardly bent portion of each terminal 60, 60A is wrapped about and welded to its respective connector pin 14, 14A. The terminals such as terminals 60 and 60A are electrically connected to various components of the sensor 10, as will be described later. The pins such as pins 14 and 14A provide electrical connection between the electrical circuits within the sensor 10 and the vehicle electrical circuitry external of the sensor 10.

Two metal tabs extend from one end of the base 30 and are bent downwardly. One end of band A is welded to the tab 62 which is formed in one piece with terminal 60. One end of band B is welded to a tab (not shown) which is similar to the tab 62 and which is formed in one piece with terminal 60B. The two metal tabs securely fix the ends of the bands in position relative to the base 30.

Underneath the base 30, the firing contact 48 is welded to terminal 60A which is welded to pin 14A. The firing contact 50 is welded to terminal 60C which is welded to pin 14C. The firing contacts 48 and 50 are made of a flexible conductive material. The preferred material is beryllium copper. The firing contacts 48 and 50 are gold plated on the exposed side on which they contact the bands A and B. The firing contact 48 projects through a slot 66 in the base 30 and above the guide surface 32, into the path of movement of the portion of band A which is wrapped around the roller 40. The firing contact 50 projects through a slot 68 in the base 30 and above the guide surface 32, into the path of movement of the portion of band B which is wrapped around the roller 40.

The base 30 includes a pair of front stops 70 and 72 which extend upwardly from the guide surface 32 in a direction generally perpendicular to the chassis 12. The front stops 70 and 72 are molded in one piece with the remainder of the base 30. The front stops 70 and 72 limit movement of the roller 40 in a direction toward the right end of the base 30, as viewed in FIG. 2.

The base 30 also includes a backstop 74, molded in one piece with the remainder of the base 30, which extends upwardly from the base 30 in a direction generally perpendicular to the chassis 12. A set screw 76 is rotatably threaded into the backstop 74. The set screw 76 has a positioning surface 78 on its axial end facing toward the roller 40. The positioning surface 78 provides point contact with the roller 40. Rotation of the set screw 76 in the backstop 74 moves the positioning surface 78 axially relative to the base 30 so that the initial position of the roller 40 can be precisely set.

In accordance with a feature of the present invention, underneath the base 30, on the side of the base 30 opposite the guide surface 32, there are fixed a pair of J-shaped band tensioners 80 and 82. The band tensioner 80 (FIG. 4) has a first portion 84 welded to a terminal 60D fixed to the base 30. A curved end portion 86 of the band tensioner 80 extends from the first portion 84. The curved end portion 86 is spaced from the base 30 and projects outwardly of the guide surface 32. The band tensioner 82 is identical to the band tensioner 80. A first portion is welded to a terminal (not shown) fixed to the base 30. The tensioner 82 has a curved end portion projecting outwardly of the guide surface 32 and spaced from the base 30. Because the tensioners 80 and 82 are located underneath the base 30 opposite the guide surface 32, they take up little space within the sensor 10.

The band tensioners 80 and 82 ar made of beryllium nickel about 0.165 mm thick with a minimum yield strength of 200 ksi. The band tensioners 80 and 82 are resilient, that is, are flexible in the direction indicated by arrow 89 in FIG. 4. Thus, forces applied to the bands A and B which would tend to pull the roller 40 away from the guide surface are absorbed by the resilient tensioners.

Figure 4:
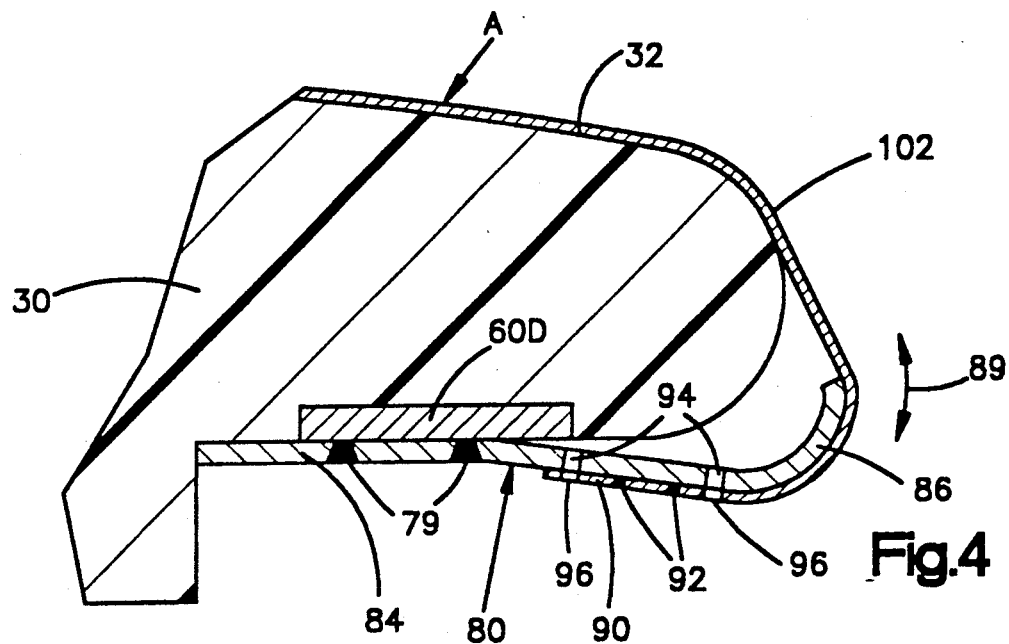
FIG. 4 is an enlarged fragmentary sectional view of the sensor of FIG. 1 illustrating one of the band tensioners of the sensor of FIG. 1.

One end 90 of band A (FIG. 4) is welded to the band tensioner 80 underneath the base 30 at four weld locations 92, two of which are shown in FIG. 4. Two openings 94 in the band tensioner 80 are aligned with corresponding openings 96 (FIG. 5) in the band end portion 90 during assembly to aid in positioning the parts. The band A extends from the first portion 84 of the tensioner 80 around the curved end portion 86 of the tensioner 80 toward the guide surface 32 of the base 30. The curved end portion 86 of the tensioner 80 directs the band A toward the guide surface 32 of the base 30 at an appropriate angle and location.

A first portion 102 of the band A extends off the curved end portion 86 of the tensioner 80 onto the curved guide surface 32 of the base 30. The first band portion 102 overlies the guide surface 32 and extends longitudinally along the guide surface 32 toward the roller 40. The first portion 102 of band A extends under the roller 40, then curves upwardly and wraps around the outer cylindrical surface of the roller 40 as seen in FIG. 1.

Figure 5:
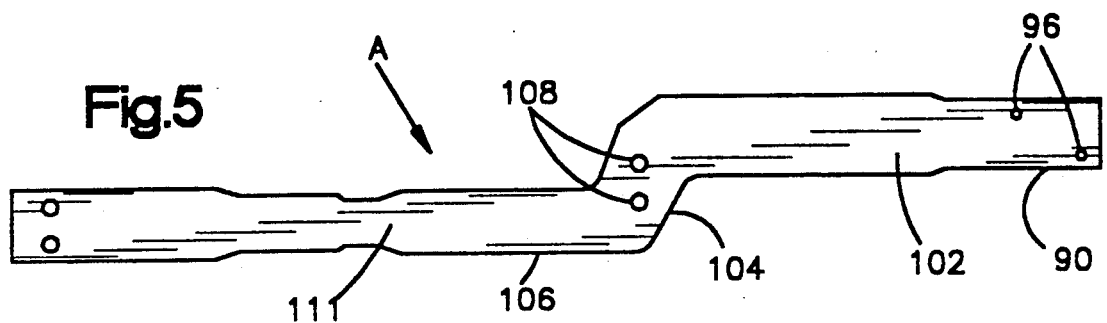
FIG. 5 is a plan view of one of the bands of the sensor of FIG. 1 in a flat condition.

The band A is generally S-shaped, as seen best in FIG. 5. Midway along the length of band A, at a location where the band wraps around the roller 40, an angled connector portion 104 connects the first band portion 102 with a second band portion 106. Two holes 108 in the angled connector portion receive a pair of dimples 110 (FIG. 3) on the roller 40 to retain band A in position relative to the roller 40. The second band portion 106 completes the wrap around the roller 40 begun by the first portion 102 and extends along the guide surface 32 of the base 30 to the other end of the base 30. The second band portion 106 extends off the curved guide surface 32 of the base 30 onto the tab 62. The end of the second band portion 106 of band A is welded to the tab 62.

The band A has a tapered region 111 (FIG. 5) for calibration of the initial biasing force which the band A applies to the roller 40. The initial position of the roller 40 may be set at different locations along the tapered region 111 to change the initial biasing force with which the band A biases the roller 40 against the set screw 76. If the roller 40 is initially set on an area of wider band width in the tapered region 111, the band A provides a lesser biasing force to the roller 40. Similarly, if the roller 40 is on an area of narrower band width in the tapered region 111, the band A provides a greater biasing force to the roller 40. Appropriate rotation of the set screw 76 selectively positions the roller 40 at a desired location along the tapered region 111. Thus, the initial position of the roller 40 controls the amount of force necessary to move the roller 40 from its initial position, and also controls the distance through which the roller 40 must move to engage the firing contacts 48 and 50.

An end portion 112 (FIG. 1) of band B is welded to the other band tensioner 82 in a manner similar to the manner in which band A is welded to tensioner 80. The tensioner 82 has two dimples which are received in corresponding openings in the band end portion 112 for positioning the parts during assembly. The tensioner 82 also has an opening which receives a dimple projecting from the base 30, also for positioning. The band B extends around the curved end portion of the tensioner 82 toward the guide surface 32 of the base 30. The tensioner 82 directs band B toward the guide surface 32 of the base 30 at an appropriate angle and location.

A first portion 126 of the band B extends off the curved end portion of the tensioner 82 onto the curved band guide surface 32 of the base 30. The first band portion 126 overlies the guide surface 32 and extends longitudinally along the guide surface 32 toward the roller 40. The first band portion 126 extends under the roller then curves upwardly and wraps around the outer cylindrical surface of the roller 40 as seen in FIG. 1.

The band B is a mirror image of band A. Midway along its length, at a location where it wraps around the roller 40, band B has an angled connector portion 130 which connects the first band portion 126 with a second band portion 132. Two holes in the angled connector portion 130 receive a pair of dimples 136 on the roller 40 to retain band B in position relative to the roller 40. The second band portion 132 completes the wrap around the roller 40 begun by the first portion 126 and extends along the guide surface 32 of the base 30 to the other end of the base 30. The second band portion 132 extends off the curved guide surface 32 of the base 30 to the tab 64. The end of the second band portion 132 of band B is welded to the tab 64.

Like band A, band B also has a tapered region for calibration of the initial band bias force. The two tapered regions of the bands are identical and are laterally directly across from each other on the guide surface 32. The two tapered regions are thus in the same longitudinal position along the path of rolling movement of the roller 40. Thus, setting the initial position of the roller 40 at different locations along the tapered regions changes the initial biasing force which both bands apply to the roller 40.

Figure 2:
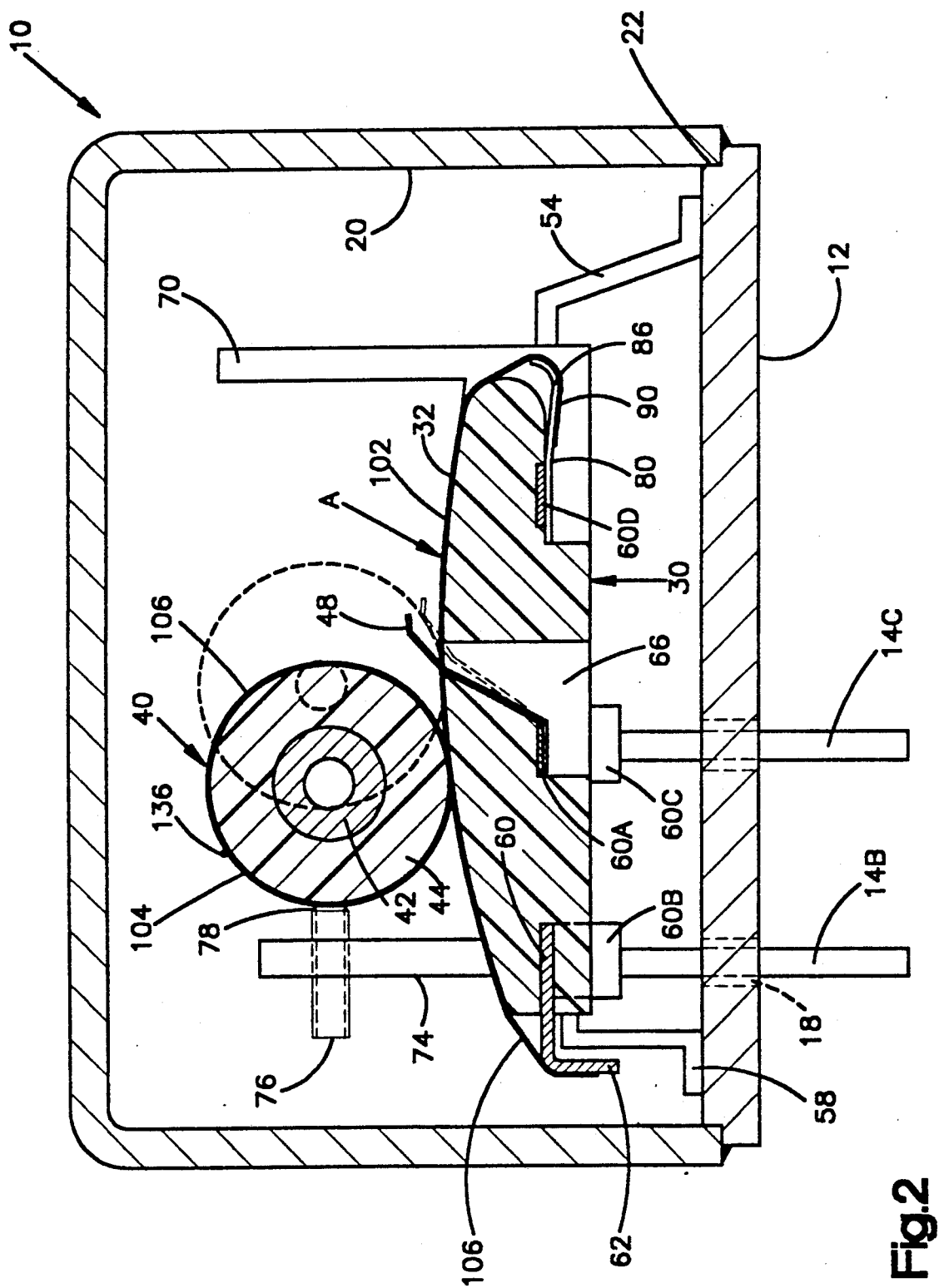
FIG. 2 is a longitudinal sectional view of the sensor of FIG. 1.

The sensor 10 is designed to be mounted in a vehicle such as an automobile with the roller 40 in an initial position as illustrated in solid lines in FIGS. 1 and 2. The roller 40 is spaced from the firing contacts 48 and 50, in contact with the positioning surface 78 on the set screw 76. The bands bias the roller 40 toward the set screw 76, because the combined cross-sectional area of the two bands at the tapered regions of the bands is less than the cross-sectional area of the second portions 106 and 132 of the bands. If the sensor 10 is to sense deceleration of a vehicle moving forward, the sensor 10 is mounted with the roller 40 toward the rear end of the vehicle. Deceleration of the vehicle at a sufficient rate for a long enough time interval causes the roller 40 to roll along the guide surface 32 of the base 30 away from the set screw 76 against the bias of the bands. If the roller 40 rolls far enough away from the set screw 76, the second portions 106 and 132 of the bands contact the firing contacts 48 and 50. Since the firing contacts 48 and 50 and the bands are made of electrically conductive metal, an electrical current can then flow between the firing contacts 48 and 50 and the bands. Such an electrical current flow can be used, for example, to trigger a vehicle occupant restraint system such as an airbag.

Figure 6:
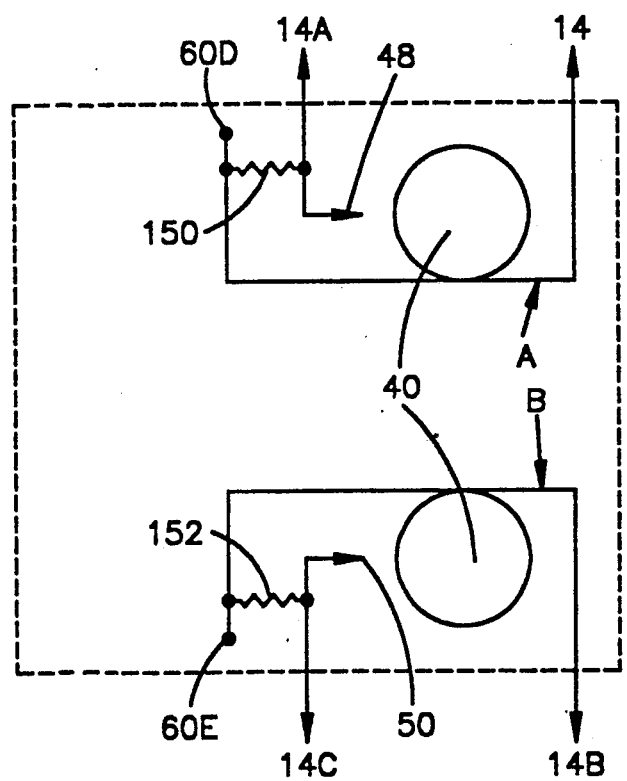
FIG. 6 is a schematic diagram of the electrical circuitry of the sensor of FIG. 1.

FIG. 6 is a schematic diagram of the sensor 10, showing the two identical electrical circuits within the sensor 10. A resistor 150 is electrically connected between the terminal 60D to which the end 102 of band A is connected, and pin 14A to which the firing contact 48 is connected. Similarly, a resistor 152 is electrically connected between the terminal 60E to which one end of band B is connected, and pin 14C to which the firing contact 50 is connected. When the roller has not moved far enough for the bands A and B to engage the contacts 48 and 50, this circuit arrangement allows for constant small current flows through the resistors 150 and 152 to indicate the presence of the sensor 10 in the electrical circuitry of the vehicle to test the integrity of the electrical connections of the sensor 10 to the vehicle circuitry and to test the integrity of bands A and B in the sensor. When the roller has not moved far enough for the bands A and B to engage the contacts 48 and 50, current enters through pins 14 and 14B, through the resistors 150 and 152, and out pins 14A and 14C. The current flow bypasses contacts 48 and 50. When the roller 40 moves from its initial position to its firing position (shown in dot dash lines in FIG. 2) and the bands A and B engage the contacts 48 and 50, current enters through pins 14 and 14B, flows through the bands A and B, flows through the firing contacts 48 and 50 (bypassing the resistors), and out pins 14A and 14C.

In accordance with another feature of the present invention, an optional electromagnet 160 (FIG. 7) provides a self-testing capability for the sensor. The electromagnet 160 includes a core 162 (FIG. 11) which is a single U-shaped piece of ferromagnetic material such as carbon steel which is preferably nickel plated. A central portion 168 of the core 162 extends transverse to the path of rolling movement of the roller 40. The central portion 168 of the core 162 may be circular, elliptical, or polygonal in cross-section. The central portion 168 is flanked by retainer portions 172 and 174 which are wider from top to bottom as viewed in FIG. 7 than the central portion 168 but narrower from front to back. Two poles or leg portions 169 and 170 are spaced about and extend parallel to the path of rolling movement of the roller 40. When the electromagnet 160 is energized, magnetic poles of opposite polarity are formed on the legs 169 and 170, respectively.

The electromagnet coil 164 may be wound directly on the bare metal of the central portion 168 of the core 162. Alternatively, the central portion 168 may be coated with an insulating layer of epoxy which is applied as a liquid to the metal and then solidifies. The electromagnet coil 164 would then be wound directly on the insulating layer of epoxy on the metal central portion 168 of the core 162. In either case, it is said that the electromagnet coil 164 is wound directly on the central portion 168 of the core 162, as opposed to being wound on a plastic bobbin on the central portion 168. The coil windings are held in place laterally on the core 162 by the retainer portions 172 and 174. Thus, no separate bobbin is needed for the coil winding, which eliminates this part, saves weight, and simplifies assembly. The windings terminate in wires 165 and 167 attached to connector pins 14F and 14G, respectively.

An electromagnet frame supports the core 162 and coil 164 on the chassis 12. The frame is made of a non-ferromagnetic material, preferably austenitic stainless steel. The frame comprises two frame halves 180 and 182 located at either end of the central portion 168 of the core 162. The frame half 180 includes a bottom portion 184 which is welded to the chassis 12 at weld locations 186. A leg portion 188 on the frame half 180 extends upwardly from the bottom portion 184 and terminates in an L-shaped core mounting portion 190. The core mounting portion 190 is welded to the retainer portion 172 of the core 162 at weld location 192, and to the leg portion 170 of the core 162 at weld location 194. The other frame half 182 is a mirror image of the frame half 180 and includes a bottom portion 196 which is welded to the chassis 12 at weld locations 198. A leg portion 200 on the frame half 182 extends upwardly from the bottom portion 196 and terminates in an L-shaped core mounting portion 202. The core mounting portion 202 is welded to the retainer portion 174 of the core 162 and to the leg portion 169 of the core 162.

The electromagnet core 162 and the frame are dimensioned so that the electromagnet 160 may optionally be fixed to the chassis 12 without increasing the overall size of the sensor 10. The coil 164 is supported above the band tensioners 80 and 82 at on end of the base guide surface 32. The electromagnet legs 169 and 170 are supported over the terminals such as terminals 60 and 60A extending from the base and are spaced about the path of rolling movement of the roller. The sensor 10 can thus be configured either with or without the self-testing capability provided by the electromagnet 160, while using a majority of common parts and without increasing the overall size of the sensor.

When the sensor 10 includes the optional electromagnet 160, a different roller 210 is used. The roller 210 includes a ferromagnetic insert so that the roller 210 can be attracted by the electromagnet 160. The roller 210 (FIG. 9) is cylindrical and includes a metal roller insert 212 around which is molded a roller shell 213. The roller shell 213 is preferably made of the same material as the base 30. The roller insert 212 is made of a ferromagnetic material. Plain carbon steel such as AISI 1006 through 1018 may be used for the roller insert 212. A preferred material is AISI 1006 carbon steel which is nickel plated. The roller 210 is hollow and has a axial passage 211.

The magnetic attractive force of the electromagnet 160 on the roller 210 is dependent upon the exposed surface area of the ferromagnetic roller insert 212 at the air gaps between the ends of the roller 210 and the electromagnet poles 169 and 170. It is thus desirable for the roller insert 212 to have as large a surface area as possible at its ends 214 and 216, to increase the effectiveness of the electromagnet. However, it is also desirable to minimize the weight and thus the inertia of the roller 210 to make the sensor 10 more responsive. Thus, in accordance with a feature of the present invention, the ferromagnetic roller insert 212 has a larger cross-sectional area at its axial ends 214 and 216, than at its middle portion 218. Forming the ferromagnetic roller insert 212 in this "dumb-bell" shape increases the effective attractive force of the electromagnet 160, without unduly increasing the weight and inertia of the roller 210.

If the sensor 10 is placed in a vehicle in proximity to a magnetic device such as an automobile radio loudspeaker, the magnetic field from that device can adversely affect the operation of the sensor 10 by attracting or repelling the ferromagnetic roller 210. It is therefore important to shield the sensor from external magnetic fields. In accordance with a feature of the present invention, the chassis 12 and the cover 20 of the sensor 10 are made of a ferromagnetic material which shields the roller 210 from external magnetic fields. The material of which the chassis 12 is made must also bond well with the glass 18 used to seal the connector pin openings 16, in order to maintain a clean environment inside the sensor 10, while being corrosion resistant and having a relatively low cost. Stainless steel 409 meets these requirements. Stainless steel 304 may be used if shielding is not required.

The electromagnet 160 is selectively operable to test the sensor 10 by attracting the roller 210 to its firing position to simulate vehicle deceleration above a predetermined rate which the sensor 10 is designed to sense. To test the sensor, the electromagnet 160 is energized by passing an electric current between pins 14F and 14G of the sensor 10 through the coil 164. The electromagnet 160 generates a magnetic field which attracts the ferromagnetic insert 212 in the roller 210, causing the roller 210 to move along the guide surface 32 in a direction toward the coil 164. When the roller 210 reaches the firing contacts 48 and 50, the second band portions 106 and 132 wrapped around the roller 210 contact the firing contacts 48 and 50, completing the two electric circuits through the sensor 10. When the test is complete, the electromagnet 160 is deenergized, and the roller 210, because of the biasing force of the bands, rolls back along the guide surface 32 to its initial position.

Figure 7:
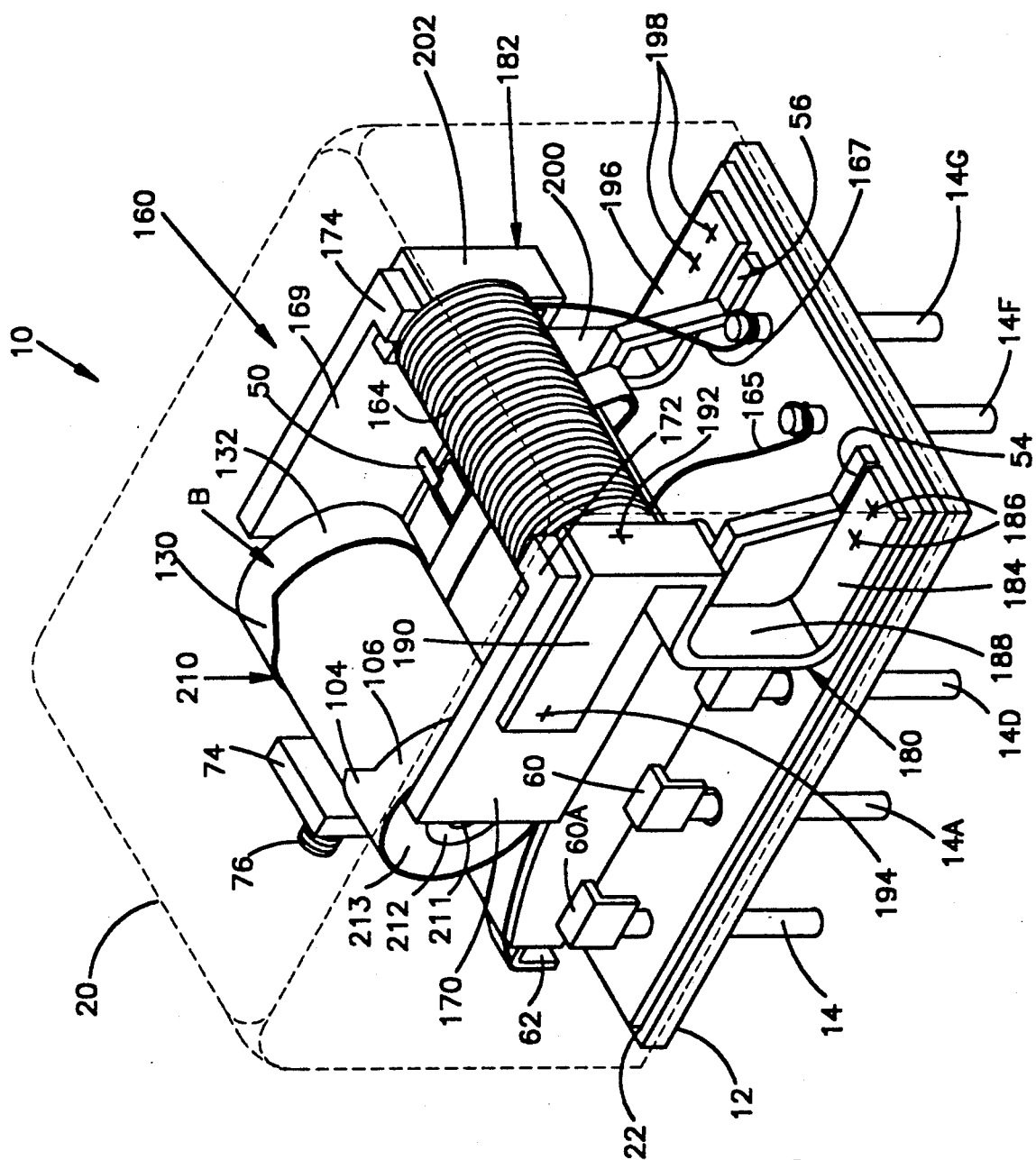
FIG. 7 is a perspective view of the sensor of FIG. 1 with the optional electromagnet assembly, and with the cover shown in dotted lines only.
Figure 8:
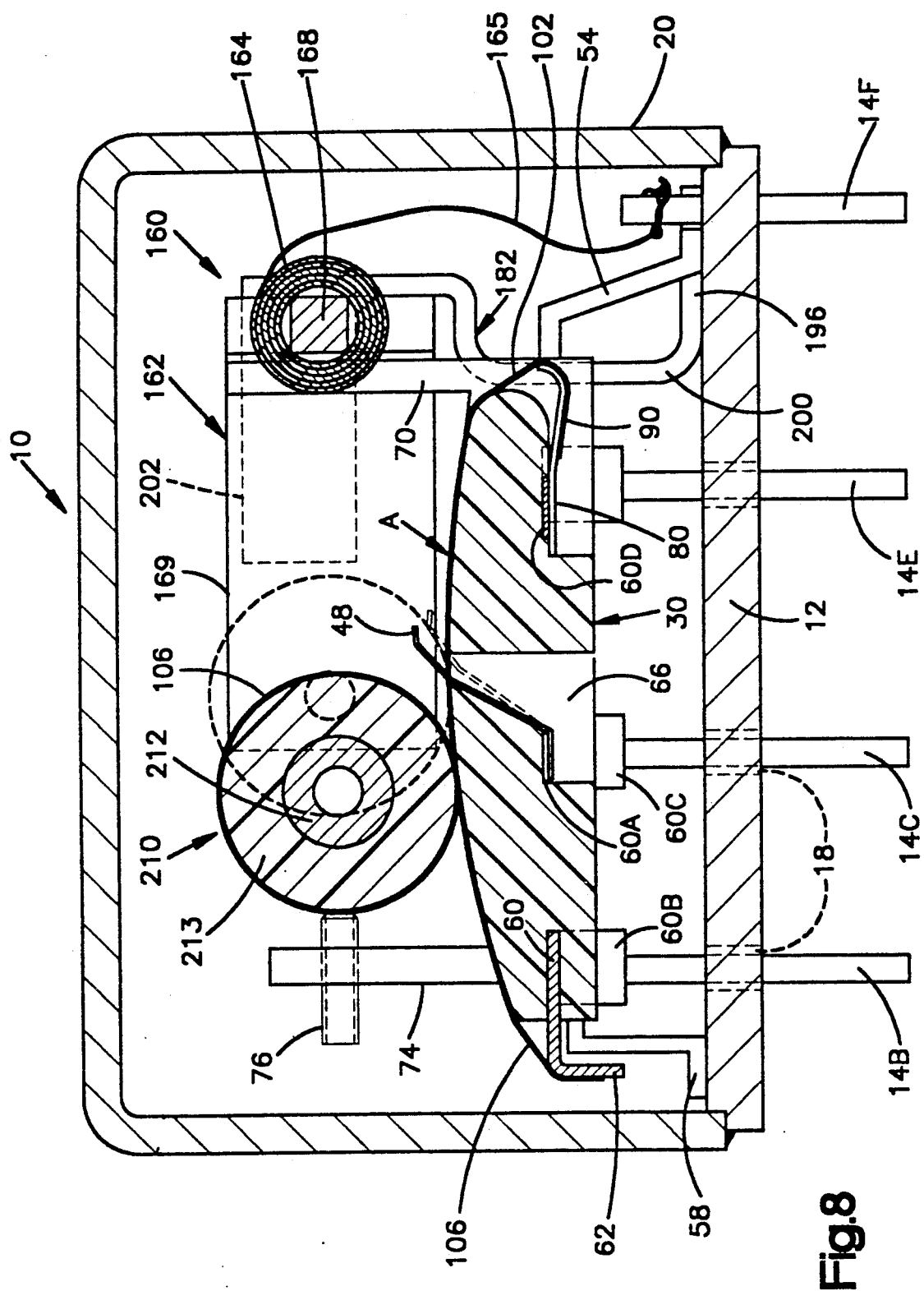
FIG. 8 is a longitudinal sectional view of the sensor of FIG. 7.

FIG. 10 is a schematic diagram of the sensor 10 including the optional electromagnet 160. For convenience, the diagram shows the roller 210 twice, that is, separately in each circuit. The two electrical circuits within the sensor 10, including the two bands A and B and the two firing contacts 48 and 50, are essentially independent of each other and are identical. When the bands A and B are not engaging the firing contacts 48 and 50, a constant small current flows between pins 14 and 14D, and also between pins 14B and 14E, to test the integrity of the bands, to indicate the presence of the sensor in the electrical circuitry of the vehicle and to test the integrity of the electrical connections of the sensor to the vehicle circuitry. When the roller 210 moves from its initial position to its firing position, the bands A and B contact the firing contacts 48 and 50, respectively, and the electrical circuits within the sensor are completed. Current flows in terminals 14 and 14B, through the bands A and B and the firing contacts 48 and 50, and out terminals 14A and 14C. There are no internal resistors, so terminals 14D and 14E are provided to enable external connection to the ends of the bands A and B. Two extra pins 14F and 14G are also needed when the sensor includes the electromagnet 160. Thus, four extra openings in the chassis 12 are shown in FIGS. 7 and 10. The chassis 12 is otherwise the same.

From the above description of a preferred embodiment of the invention, those skilled in the art will perceive improvements, changes, and modifications therein. Such improvements, changes, and modifications within the skill of the art are intended to be covered by the appended claims.

We claim:

1. An apparatus comprising:
   a movable member;
   a base having a guide surface defining a path along which said movable member moves;
   a band of flexible electrically conductive material at least partially encircling said movable member and which is partially displaced upon movement of said movable member, said band having first and second end portions, said first end portion being fixedly attached to said base;
   an electrically conductive member in the path of displacement of said band at a location spaced from said movable member and said band when said movable member and band are in a first position, said movable member being movable along said guide surface from said first position to a second position in which a portion of said band contacts said conductive member to complete a circuit for electrical current through said conductive member and said band; and
   a band tensioner applying a force to said band to tension said band, said band tensioner having a first portion connected to a side of said base under said guide surface, said band tensioner projecting outwardly of said guide surface and having a curved end portion spaced from said base, said second end portion of said band being fixed to said first portion of said band tensioner, said band extending from said first portion of said band tensioner around said curved end portion of said band tensioner toward said guide surface of said base.

2. An apparatus as defined in claim 1 having two separate electric circuits completed by movement of said movable member to said second position, each said circuit including a respective band, band tensioner and conductive member.

3. An apparatus as defined in claim 1 wherein said band tensioner is made of electrically conductive material and said circuit includes said band tensioner.

4. An apparatus as defined in claim 1 wherein said band tensioner is a resilient metal member.

5. An apparatus as defined in claim 1 wherein said movable member is a roller.

6. An apparatus comprising:
   a movable member at least in part of ferromagnetic material;
   a base mounted on a chassis and having a guide surface defining a path along which said movable member moves, said movable member being movable along said guide surface from a first position due to a force acting thereon;
   a band of flexible, electrically conductive material which at least partially encircles said movable member and which is partially displaced upon movement of said movable member, said band having first and second end portions;
   means for fixedly attaching said first and second end portions of said band to said base;
   an electrically conductive member at a location spaced from said movable member when said movable member is in said first position and in the path of displacement of said band, said movable member being movable along said guide surface from said first position to a second position in which a portion of said band contacts said conductive member to complete a circuit for electrical current through said conductive member and said band; and
   an electromagnet selectively operable to move said movable member along said guide surface from said first position to said second position to complete said circuit to test the apparatus, said electromagnet including a non-ferromagnetic frame and a U-shaped core attached to said frame, said conductive member being located between said coil and said movable member when said movable member is in its first position, said chassis having a portion on which said frame is selectively fixed.

7. An apparatus as defined in claim 6 wherein said movable member is a roller.

8. An apparatus as defined in claim 7 wherein said electromagnet has poles spaced about the path of displacement of said roller, and said roller has an axially extending dumb-bell shaped ferromagnetic insert with axial end portions having larger radial dimensions than the axially central portion of said insert, said end portions having end faces partially defining air gaps between said insert and said poles, each of said end faces having a surface area greater than the cross-sectional surface area of said insert at a location axially inwardly from said end faces.

9. An apparatus as defined in claim 7 including a band tensioner fixed to said base and applying a force to said band to tension said band, said band tensioner having a first portion connected to said base on a side thereof opposite said guide surface, said band tensioner projecting outwardly of said guide surface and having a curved end portion spaced from said base, said band having an end portion fixed to said first portion of said band tensioner, said band extending from said first portion of said band tensioner around said curved end portion of said band tensioner toward said guide surface of said base.

10. An apparatus as defined in claim 7 having two separate electric circuits completed by movement of said roller to said second position, each said circuit including a respective band, band tensioner and conductive member.

11. An apparatus as defined in claim 6 wherein said electromagnet includes a one-piece ferromagnetic core and a coil wound directly on said core, said core including a central portion with a relatively small transverse dimension on which said coil is wound, a retainer portion at each end of said central portion and having a transverse dimension greater than the transverse dimension of said central portion for retaining the windings of said coil on said central core portion, and two poles extending from said retainer portions, said conductive member being located between said coil and said movable member when said movable member is in said first position.

12. An apparatus as defined in claim 6 including a cover and a chassis sealingly enclosing said base and said movable member, said cover and said chassis being made of ferromagnetic material thereby shielding said movable member from the effects of external magnetic fields.

13. An apparatus comprising:
a movable member made at least in part of ferromagnetic material;
a base having a guide surface defining a path along which said movable member moves, said movable member being movable along said guide surface from a first position due to a force acting thereon;
a band of flexible, electrically conductive material which at least partially encircles said movable member and which is partially displaced upon movement of said movable member, said band having first and second end portions;
means for fixedly attaching said first and second end portions of said band to said base;
an electrically conductive member at a location spaced from said movable member when said movable member is in said first position and in the path of displacement of said band, said movable member being movable along said guide surface from said first position to a second position in which a portion of said band contacts said conductive member to complete a circuit for electrical current through said conductive member and said band; and
an electromagnet selectively operable to move said movable member along said guide surface from said first position to said second position to test the apparatus, said electromagnet including a one-piece core and a coil wound directly on said core, said core including a central portion with a relatively small transverse dimension on which said coil is wound, a retainer portion at each end of said central portion and having a transverse dimension greater than the transverse dimension of said central portion for retaining the windings of said coil on said central core portion, and two poles extending from said retainer portions, said conductive member being located between said coil and said movable member when said movable member is in said first position.

14. An apparatus as defined in claim 13 wherein said movable member is a roller.

15. An apparatus as defined in claim 14 including a band tensioner fixed to said base and applying a force to said band to tension said band, said band tensioner having a first portion connected to said base on a side thereof opposite said guide surface, said band tensioner projecting outwardly of said guide surface and having a curved end portion spaced from said base, said band having an end portion fixed to said first portion of said band tensioner and said band extending from said first portion of said band tensioner around said curved end portion of said band tensioner toward said guide surface of said base.

16. An apparatus as defined in claim 14 wherein said roller has an axially extending dumb-bell shaped ferromagnetic insert with axial end portions having larger radial dimensions than the axially central portion of said insert, said end portions having end faces defining partially air gaps between said insert and said poles, each of said end faces having a surface area greater than the cross-sectional surface area of said insert at a location axially inwardly from said end faces.

17. An apparatus as defined in claim 16 including a cover and a chassis sealingly enclosing said base and said roller, said cover and said chassis being made of ferromagnetic material thereby shielding said movable member from the effects of external magnetic fields.

18. An apparatus comprising:
a movable member at least in part of ferromagnetic material
a base having a guide surface defining a path along which said movable member moves, said movable member being movable along said guide surface from a first position due to a force acting thereon;
a band of flexible, electrically conductive material which at least partially encircles said movable member and which is partially displace upon movement of said movable member, said band having first and second end portions;
means for fixedly attaching said first and second end portions of said band to said base;
an electrically conductive member at a location spaced from said movable member when said movable member is in said first position and in the path of displacement of said band, said movable member being movable along said guide surface from said first position to a second position in which a portion of said band contacts said conductive member to complete a circuit for electrical current through said conductive member and said band;
an electromagnet selectively operable to move said movable member along said guide surface from said first position to said second position to test the apparatus; and a cover and a chassis sealingly enclosing said base and said movable member, said cover and said chassis being made of ferromagnetic material thereby shielding said movable member from the effects of external magnetic fields.

19. An apparatus as defined in claim 18 wherein said chassis has a plurality of openings through which a plurality of connector pins extend for connecting said apparatus to external circuitry, said openings being sealed by glass.

20. An apparatus as defined in claim 18 wherein said movable member is a roller and said chassis and cover are made of stainless steel 409.

21. An apparatus as defined in claim 20 including a band tensioner fixed to said base and applying a force to said band to tension said band, said band tensioner having a first portion connected to said base on a side thereof opposite said guide surface, said band tensioner projecting outwardly of said guide surface and having a curved end portion spaced from said base, said band having an end portion fixed to said first portion of said band tensioner and said band extending from said first portion of said band tensioner around said curved end portion of said band tensioner toward said guide surface of said base.

22. An apparatus as defined in claim 20 wherein said electromagnet includes a one-piece core and a coil wound directly on said core, said core including a central portion with a relatively small transverse dimension on which said coil is wound, a retainer portion at each end of said central portion and having a transverse dimension greater than the transverse dimension of said central portion for retaining the windings of said coil on said central core portion, and two poles extending from said retainer portions, said conductive member being located between said coil and said movable member when said movable member is in said first position.

23. An apparatus as defined in claim 22 wherein said roller has an axially extending dumb-bell shaped ferromagnetic insert with axial end portions having larger radial dimensions than the axially central portion of said insert, said end portions having end faces partially defining air gaps between said insert and said poles, each of said end faces having a surface area greater than the cross-sectional surface area of said insert at a location axially inwardly from said end faces.

24. An apparatus comprising:
a movable member;
a base having a guide surface defining a path along which said movable member moves, said movable member being movable along said guide surface from a first position due to a force acting thereon;
a band of flexible, electrically conductive material which at least partially encircles said movable member and which is partially displaced upon movement of said movable member, said band having first and second end portions;
means for fixedly attaching said first and second end portions of said band to said base;
an electrically conductive member at a location spaced from said movable member when said movable member is in said first position and in the path of displacement of said band, said movable member being movable along said guide surface from said first position to a second position in which a portion of said band contacts said conductive member to complete a circuit for electrical current through said conductive member and said band; and an electromagnet selectively operable to move said movable member along said guide surface from said first position to said second position to test the apparatus, said electromagnetic including a U-shaped core having poles spaced about the path of displacement of said movable member and a coil wound on said core, said movable member having a ferromagnetic insert with end faces partially defining air gaps between said insert and said poles, each of said end faces having a surface area greater than the cross-sectional surface area of said insert at a location axially inwardly from said end faces.

25. An apparatus as defined in claim 24 wherein said movable member is a roller and said ferromagnetic insert is an axially extending dumb-bell shaped insert with axial end portions having larger radial dimensions than the axially central portion of said insert.

26. An apparatus as defined in claim 25 including a cover and a chassis sealingly enclosing said base and said roller, said cover and said chassis being made of ferromagnetic material thereby shielding said roller from the effects of external magnetic fields.

27. An apparatus as defined in claim 24 including a band tensioner fixed to said base and applying a force to said band to tension said band, said band tensioner having a first portion connected to said base on a side thereof opposite said guide surface, said band tensioner projecting outwardly of said guide surface and having a curved end portion spaced from said base, said band having an end portion fixed to said first portion of said band tensioner and said band extending from said first portion of said band tensioner around said curved end portion of said band tensioner toward said guide surface of said base.

28. An apparatus comprising:
a movable member;
a base having a guide surface defining a path along which said movable member moves;
a band of flexible electrically conductive material at least partially encircling said movable member and which is partially displaced upon movement of said movable membe, said band having first and second end portions, said first end portion being fixedly attached to said base;
an electrically conductive member in the path of displacement of said band at a location spaced from said movable member and said and when said movable member and band are in a first position, said movable member being movable along said guide surface from said first position to a second position in which a portion of said band contacts said conductive member to complete a circuit for electrical current through said conductive member and said band;
a band tensioner applying a force to said band to tension said band, said band tensioner having a first portion connected to a side of said base under said guide surface, said band tensioner projecting outwardly of said guide surface and having a curved end portion spaced from said base, said second end portion of said band being fixed to said first portion of said band tensioner, said band extending from said first portion of said band tensioner around said curved end portion of said band tensioner toward said guide surface of said base;
said movable member being a roller; and
further comprising a chassis to which said base is mounted and an electromagentic including. anonferromagnetic frame and a U-shaped core attached to said frame, said electromagnet having poles spaced about the path of displacement of said roller, said conductive member being located between said coil and said roller when said roller is in it first position, said chassis having a portion on which said frame is selectively fixed.

29. An apparatus comprising:
a movable member;
a base having a guide surface defining a path along which said movable member moves;
a band of flexible electrically conductive material at least partially encircling said movable member and which is partially displaced upon movement of said movable member said band having first and second end portions, said first end portion being fixedly attached to said base;
an electrically conductive member in the path of displacement of said band at a location spaced from said movable member and said band when said movable member and band are in a first position, said movable member being movable along said guide surface from said first position to a second position in which a portion of said band contacts said conductive member to complete a circuit for electrical current through said conductive member and said band;
a band tensioner applying a force to said band to tension said band, said and tensioner having a first portion connected to a side of said base under said guide surface, said band tensioner projecting outwardly of said guide surface and having a curved end portion spaced from said base, said second end portion of said band being fixed to said first portion of said band tensioner, said band extending from said first portion of said band tensioner around said curved end portion of said band tensioner toward said guide surface of said base;
an electromagnet including a one-piece ferromagnetic core and a coil wound directly on said core, said core including a central portion with a relatively small transverse dimension on which said coil is wound, a retainer portion at each end of said central portion and having a transverse dimension greater than the transverse dimension of said central portion for retaining the windings of said coil on said central core portion, and two poles extending from said retainer portions, said conductive member being located between said coil and said movable member when said movable member is in said first position.

30. An apparatus as defined in claim 29 wherein said movable member is a roller and has an axially extending dumb-bell shaped ferromagnetic insert with axial end portions having larger radial dimensions than the axially central portion of said insert, said end portions having end faces partially defining air gaps between said insert and said poles, each of said end faces having a surface area greater than the cross-sectional surface area of said insert at a location axially inwardly from said end faces.

31. An apparatus comprising:
a movable member;
a base having a guide surface defining a path along which said movable member moves;
band of flexible electrically conductive material at least partially encircling said movable member and which is partially displaced upon movement of said movable member, said band having first and second end portions, said first end portion being fixedly attached to said base;
an electrically conductive member in the path of displacement of said band at a location spaced from said movable member and said band when said movable member and band are in a first position, said movable member being movable along said guide surface from said first position to a second position in which a portion of said band contacts said conductive member to complete circuit for electrical current through said conductive member and said band;
a band tensioner applying a force to said band to tension said band, said band tensioner having a first portion connected to a side of said base under said guide surface, said band tensioner projecting outwardly of said guide surface and having a curved end portion spaced from said base, said second end portion of said band being fixed to said first portion of said band tensioner, said band extending from said first portion band tensioner toward said guide surface of said base; and
including a cover and a chassis sealingly enclosing said base and said movable member, said cover and said chassis being made of ferromagnetic material thereby shielding said movable member from the effects of external magnetic fields.

* * * * *